UNITED STATES PATENT OFFICE.

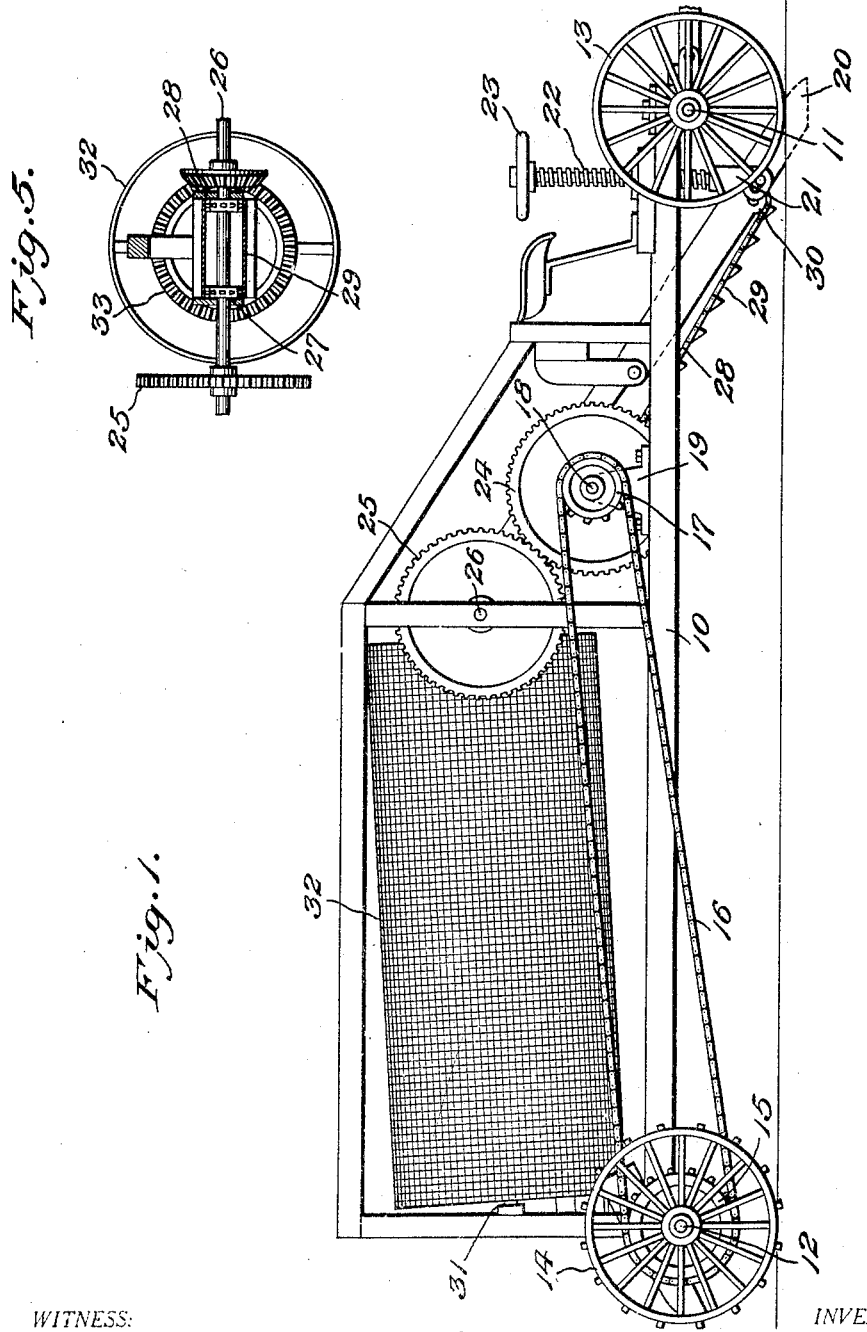

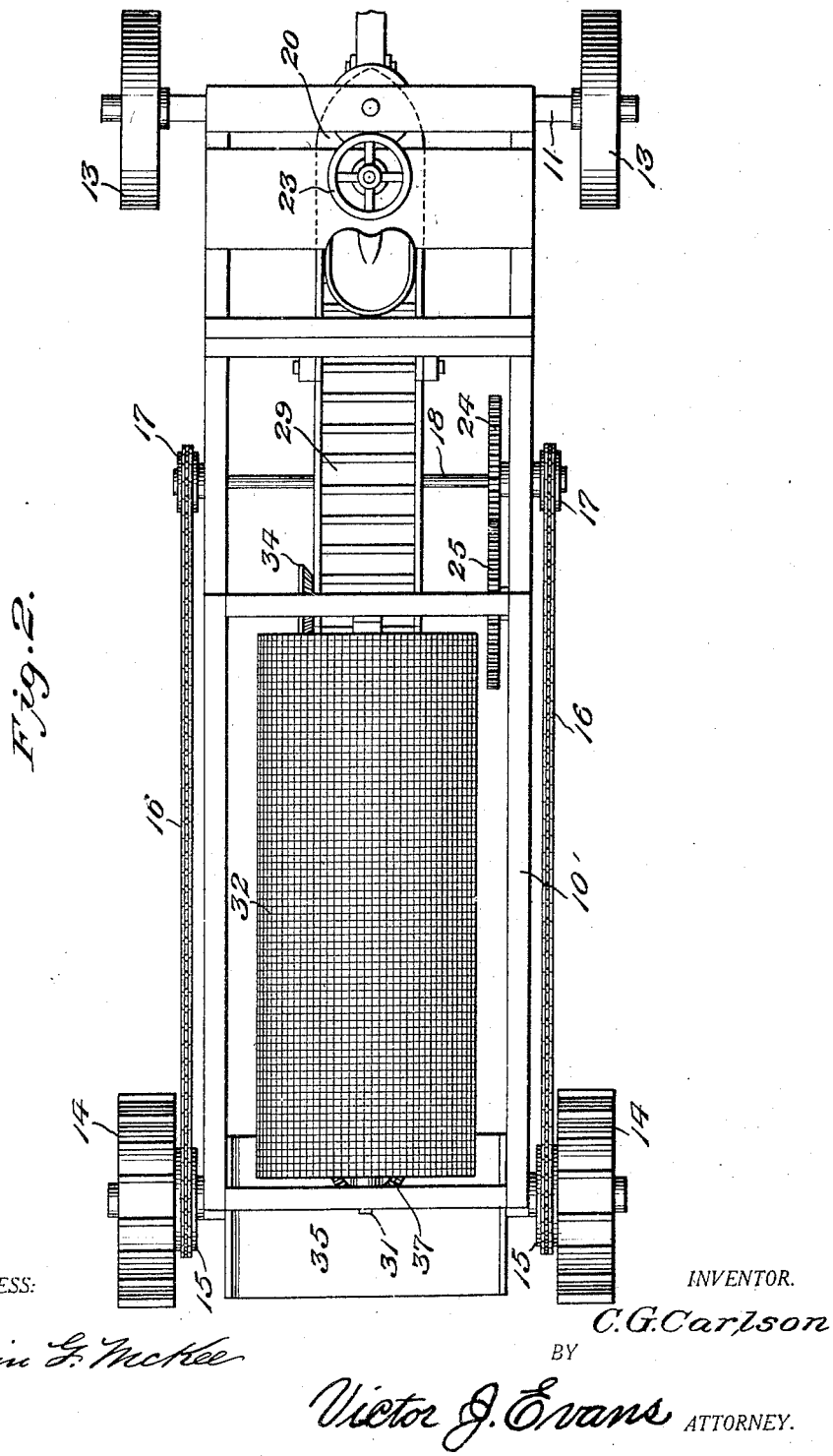

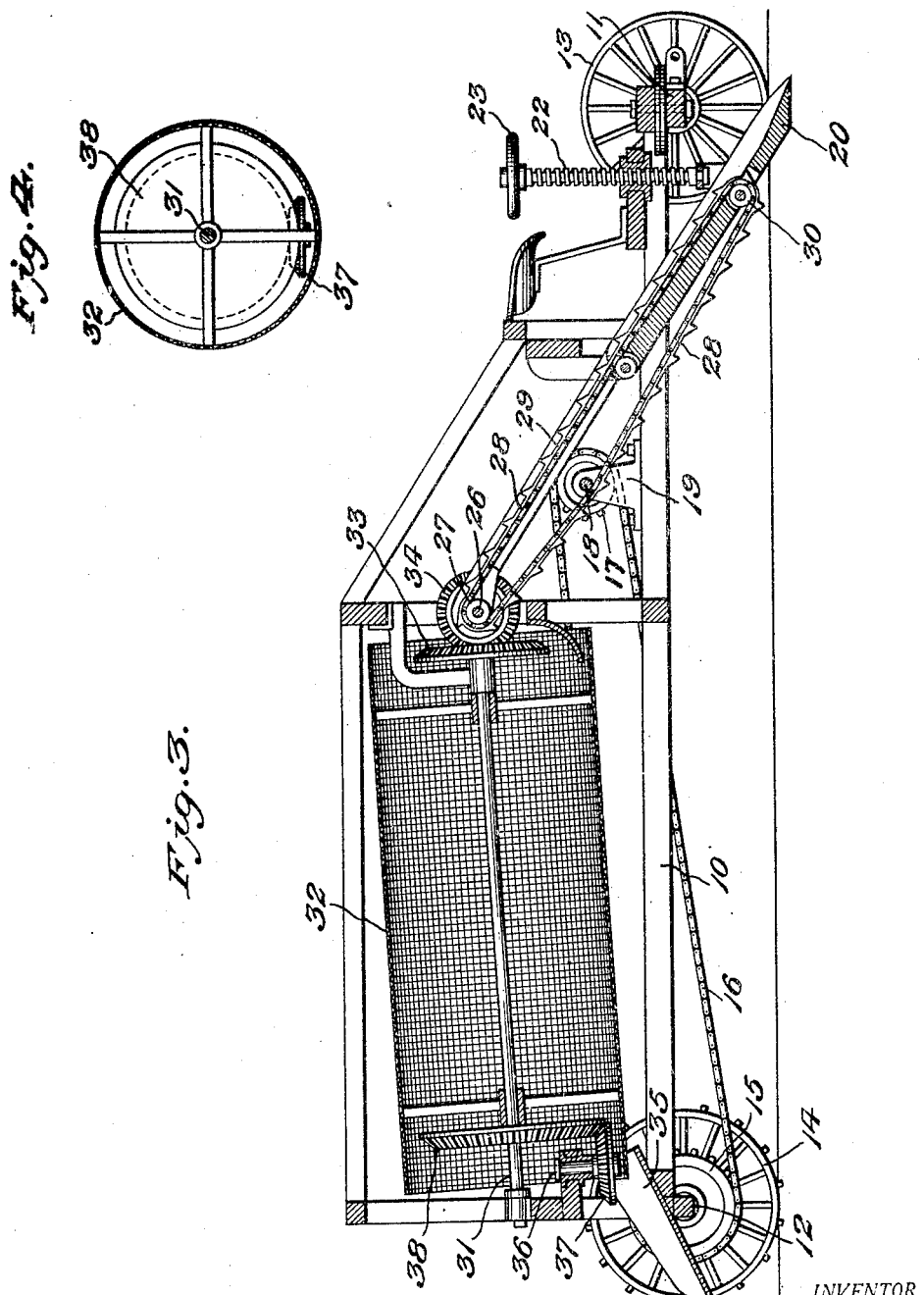

CALEB G. CARLSON, OF CARLSHEND, MICHIGAN.

QUACK-GRASS DESTROYER.

1,368,113.　　　　　Specification of Letters Patent.　　　Patented Feb. 8, 1921.

Application filed December 29, 1919. Serial No. 348,031.

*To all whom it may concern:*

Be it known that I, CALEB G. CARLSON, a citizen of the United States, residing at Carlshend, in the county of Marquette and State of Michigan, have invented new and useful Improvements in Quack-Grass Destroyers, of which the following is a specification.

This invention relates to agricultural implements and has for its object the provision of a device adapted to be drawn along the ground and provided with means for digging up grass, agitating the diggings to remove the dirt therefrom so that the dirt may return to the ground, and depositing the grass and roots thereof in a suitable receptacle.

An important object is the provision of a device of this character in which the digging member is vertically adjustable whereby it may dig at different depths.

Another object is the provision of a device of this character in which gears are provided at the rear or discharge end of the agitating member, which is in the nature of a screen, whereby the grass and roots will be more or less torn up before being discharged into the receptacle provided therefor.

An additional object is the provision of a device of this character which will be extremely simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings in which—

Figure 1 is a side elevation of my device.

Fig. 2 is a plan view thereof.

Fig. 3 is a longitudinal sectional view,

Fig. 4 is a cross section of the cylindrical screen member, and

Fig 5 is a cross sectional view taken in advance of the screen cylinder.

Referring more particularly to the drawings, the numeral 10 designates the main supporting frame which is supported upon axles 11 and 12, the former being the front one and the latter the rear one. The front axle may be movable and mounted in any desired manner for providing for steering the device. The frame may also have attached thereto any suitable draft means whereby the device may be drawn over the ground. The axles of course carry wheels 13 and 14, respectively, the latter being the rear wheels and any suitable ratchet mechanism may be provided in one of the rear wheels, if necessary or preferred. Secured upon the rear axle 12 is a sprocket 15 about which is trained a chain 16 which is trained about a sprocket 17 on a counter shaft 18 journaled in a bearing 19 mounted on the main frame 10.

Disposed centrally of the frame is a digging member 20 similar in construction to digging members of well known types such as are used on potato diggers and other implements. Connected with the forward portion of this digger member, by means of a swivel connection 21, is a vertically disposed adjusting screw 22 threaded through a suitable member carried by the frame 10 and provided with an operating wheel 23. From this construction it will be seen that the screw 22 may be adjusted for raising and lowering the digging member out of operative engagement with the ground entirely or so as to vary the depth of the cut made thereby.

Secured upon the shaft 18 is a gear 24 which meshes with a gear 25 secured upon the shaft 26 upon which are secured sprockets 27 about which are trained chains 28 associated with a conveyer belt 29 which extends along the rear portion of the digger member and which is trained about a roller 30. Journaled longitudinally of the frame is a shaft 31 carrying an agitating member formed as a cylindrical screen 32 which is positioned immediately to the rear of the conveyer 29 in position to receive grass and roots dug up by said digging member and carried upwardly by said conveyer. The forward end of the shaft 31 carries a bevel gear 33 meshing with a bevel gear 34 on the shaft 26. Secured upon the frame 10 to the rear of the rotary screen 32, is a suitable chute 35 for catching the roots and grass discharged from the screen.

In the operation of the device it will be seen that when it is drawn over the ground by any suitable propelling means, rotation of the rear wheels will cause rotation of the counter shaft 18 and shaft 26, which will result in rotation of the screen 32 and also in the operation of the conveyer 29. The digging member 20 will dig up the quack grass and in fact any other grass, and the matter dug up will pass onto the conveyer 29 and be discharged therefrom into the screen 32. As the screen 32 rotates the dirt adhering to the grass and roots will be shaken off and will fall through the screen back onto the ground while, owing to the rearward inclination of the screen, the grass and roots will pass from the screen and be discharged upon the chute 35.

I may, if desired, provide a vertical shaft 36 disposed to the rear of the screen 32 and carrying a gear 37 meshing with a gear 38 on the screen shaft 31, the purpose of these gears being to macerate partially or tear up the grass passing from the screen so that the grass will occupy less room and pack more firmly into any receptacle provided for its reception.

From the foregoing description and a study of the drawings it will be apparent that I have thus provided a very simple device which may be drawn over the ground and which will efficiently dig up quack and other undesirable grass, removing the dirt from the roots thereof, return the dirt to the ground, and discharge the grass and roots into a suitable receptacle. It will be observed that the operation of the device is automatic and will be continuous as long as it is drawn over the ground, and it will be noted that the construction is very simple so that danger of derangement will be reduced to the minimum.

While I have shown and described the preferred embodiment of my invention, it is of course to be understood that I reserve the right to make such changes in the form, construction, and arrangement of parts as will not depart from the spirit of the invention or the scope of the subjoined claim.

Having thus described my invention, I claim:—

A device of the character described comprising a wheel supported frame, a counter shaft journaled in said frame, a sprocket on said counter shaft, a sprocket on the axle of the rear wheels of the frame, a chain trained about said sprockets, a gear on said counter shaft, a second counter shaft arranged in spaced parallel relation to said first named counter shaft, a gear on said second named counter shaft meshing with said first named gear, a digger member carried by said frame and vertically adjustable, a conveyer mounted on said frame with its forward end disposed immediately at the rear of said digger member, a pair of spaced sprockets on said second named shaft, a roller journaled at the rear of said digger member, said conveyer including chains trained about said last named sprockets and said roller and further including an apron, a shaft journaled longitudinally of said frame and inclined rearwardly and downwardly, a cylindrical screen carried by said last named shaft and disposed immediately at the rear of said conveyer, intermeshing bevel gears on said last named shaft and said last named counter shaft for rotating said screen, a chute on said frame disposed beneath the rear end of said screen, a vertical shaft arranged at the rear of said screen, and intermeshing gears carried by said last named shaft and said screen supporting shaft.

In testimony whereof I affix my signature.

CALEB G. CARLSON.